United States Patent [19]

Wetzel et al.

[11] Patent Number: 5,506,318
[45] Date of Patent: Apr. 9, 1996

[54] PROCESS FOR PRODUCING N-VINYL PYRROLIDONE POLYMER HAVING LOW RESIDUAL MONOMER

[75] Inventors: Sabrina Wetzel, Hamburg; Roland C. Thorpe, Jr., Telford; Diane M. Terry, Allentown, all of Pa.

[73] Assignee: Air Products and Chemicals, Inc., Allentown, Pa.

[21] Appl. No.: 255,205

[22] Filed: Jun. 7, 1994

Related U.S. Application Data

[63] Continuation-in-part of Ser. No. 166,487, Dec. 13, 1993.
[51] Int. Cl.$^6$ .................... C08F 4/04; C08F 6/28; C08F 26/10
[52] U.S. Cl. .................... 526/219.6; 526/78; 526/79; 526/81; 526/86; 526/218.1; 526/260; 526/263; 526/264; 526/312; 526/329.7; 526/319; 526/318.2; 526/321; 526/344.1; 526/342
[58] Field of Search .................... 526/218.1, 260, 526/263, 264, 219.6, 81, 86

[56] References Cited

U.S. PATENT DOCUMENTS

| | | | |
|---|---|---|---|
| 2,497,705 | 2/1950 | Werntz | 526/264 |
| 2,665,271 | 1/1954 | Beller | 526/264 |
| 2,667,473 | 1/1954 | Morner | 526/264 |
| 2,938,017 | 5/1954 | Grosser | 526/264 |
| 3,459,720 | 8/1969 | Grosser et al. | |
| 4,053,696 | 10/1977 | Herrle et al. | |
| 4,182,851 | 1/1980 | Straub | 528/491 |
| 4,205,161 | 5/1980 | Wiest et al. | |
| 4,241,203 | 12/1980 | Wenzel | 526/218 |
| 4,520,180 | 5/1985 | Barabas et al. | |
| 4,529,753 | 7/1985 | Taylor | |
| 4,956,430 | 9/1990 | Tazi | 526/195 |
| 5,130,388 | 7/1992 | Shih | 526/228 |
| 5,268,437 | 12/1993 | Holy | 526/229 |
| 5,328,972 | 7/1994 | Dada | 526/227 |

Primary Examiner—Fred Zitomer
Attorney, Agent, or Firm—Mary E. Bongiorno; Russell L. Brewer

[57] ABSTRACT

This invention relates to an improved process for the batch polymerization, neat, of a monomer system comprising N-vinyl pyrrolidone monomer utilizing an oil soluble,-thermally activated, free radical initiator. The improvement for reducing the monomer level from about 1 to 2% by weight of the polymerization product to a level below about 0.2 and preferably below about 0.1% by weight of the polymerization reaction product comprises continuously adding an oil soluble azo type free radical generating catalyst to the polymerization reaction product and establishing and maintaining the polymerization reaction product containing residual monomer at a temperature and for a time sufficient to effect substantial polymerization of the residual monomer. Typically the oil soluble, azo type free radical generating catalyst is azobis(isobutyronitrile).

7 Claims, No Drawings

PROCESS FOR PRODUCING N-VINYL PYRROLIDONE POLYMER HAVING LOW RESIDUAL MONOMER

CROSS REFERENCE TO RELATED APPLICATIONS

This application is a continuation-in-part of Ser. No. 08/166,487, filed Dec. 13, 1993.

TECHNICAL FIELD

This invention relates to a process for reducing the level of residual monomer in an N-vinyl pyrrolidone containing polymerization reaction product.

BACKGROUND OF THE INVENTION

Processes for the polymerization of vinyl pyrrolidone polymers, with or without other ethylenic monomers copolymerizable therewith, at elevated temperature in the presence of free radical polymerization initiators are known. The resulting polymers have wide commercial acceptance because of their low toxicity and solubility in both organic solvents and water.

One of the problems associated with the batch polymerization of vinyl pyrrolidone containing polymers is in the reduction of residual monomer contained in the polymerization reaction product at the end of the normal polymerization. Residual monomer is unacceptable from an environmental point of view. It also represents an economic loss, since there is substantial cost in removing the monomer. Some of the conventional techniques for removing residual monomer have been through physical processes, e.g., steam or inert gas stripping or additional polymerization through subsequent heat treatments. These processes tend to extend the batch polymerization causing long reaction times as well as leading to product discoloration and changes in product molecular weight distribution and viscosity.

Representative patents illustrating approaches to the removal of residual monomer content in polymerization reaction products are as follows:

U.S. Pat. No. 4,053,696 disclose a process for the manufacture of vinyl pyrrolidone polymers practically free from residual monomer and impurities via a continuous polymerization technique. Polymerization is carried in an organic solvent in the presence of free radical polymerization initiators. These initiators are introduced ab initio, i.e., introduced with the initial charge of reactants or introduced at various points of the reaction.

U.S. Pat. No. 3,459,720 discloses an improved process for the polymerization of N-vinyl lactams in the presence of azo catalysts and hydrogen peroxide. Disclosed in the background portion of the patent are two methods for the polymerization of N-vinyl pyrrolidone. One method utilizes a peroxide catalyst and the other uses an azobis(isobutyronitrile) catalyst. The patentees point out that the peroxide catalysts result in products inferior in terms of color stability, odor and viscosity, while the azo catalysts yield products of superior quality, but often have a high molecular weight, too high for many purposes. The improved batch process for the polymerization of N-vinyl pyrrolidone is carried out by polymerizing the monomer in the presence of an azo catalyst and controlling the molecular weight by addition of hydroperoxide. The azo catalyst and hydroperoxide are advantageously added at the start of the polymerization to avoid any need for supervision.

U.S. Pat. No. 4,520,180 discloses a process for the polymerization of N-vinyl pyrrolidone using t-butylperoxypivalate, preferably in a solvent consisting essentially of water, isopropanol, and secondary butyl alcohol. In the polymerization process, N-vinyl pyrrolidone is continuously added to a kettle containing solvent, an initial charge of N-vinyl pyrrolidone and t-butylperoxypivalate catalyst.

U.S. Pat. No. 4,205,161 discloses a process for reducing the residual level of vinyl chloride monomer and vinyl chloride monomer in polymers and copolymers. The process comprises post-polymerizing the polymerization reaction product until there is a decrease in the autogenous pressure, then releasing the pressure, cooling the copolymer to a temperature of from 10° to 40° C. and introducing a redox catalyst to effect final polymerization.

U.S. Pat. No. 4,529,753 discloses a process for reducing the residual monomer level in emulsion polymerization reaction products. Residual acrylonitrile is reduced in a latex by adding stoichiometric amounts of amine, by adding additional catalysts and comonomer, steam or inert gas stripping or passing a latex through an apparatus that reduces pressure. A process described in the '753 patent utilizes temperature and pressure conditions at which the vapor pressure of water in ambient environment is less than the vapor pressure water in the emulsion and then utilizes a free radical generator to polymerize residual monomer in the emulsion.

U.S. Pat. No. 4,241,203 discloses a process for reducing the monomer content in acrylonitrile containing copolymers by heating the polymerization product to a temperature slightly exceeding 130° C. for a time sufficient to permit polymerization of the residual monomer.

SUMMARY OF THE INVENTION

This invention relates to an improved process for the batch polymerization, neat, of a monomer system comprising N-vinyl pyrrolidone monomer utilizing an oil soluble, thermally activated, free radical initiator. The improvement for reducing the monomer level from about 1 to 2% by weight of the polymerization product to a level below about 0.2 and preferably below about 0.1% by weight of the polymerization reaction product comprises continuously adding an oil soluble azo type free radical generating catalyst to the polymerization reaction product and establishing and maintaining the polymerization reaction product containing residual monomer at a temperature and for a time sufficient to effect substantial polymerization of the residual monomer. Typically the oil soluble, azo type free radical generating catalyst is azobis(isobutyronitrile).

Several advantages are achieved. They include: an ability to achieve low residual monomer with small catalyst additives, an ability to achieve low monomer levels at enhanced rates leading to short post-polymerization schedules, an ability to reduce monomer level without imparting undesirable color and an ability to obtain low monomer concentrations in the polymerization reaction product with reduced catalyst, reduced catalyst levels resulting in cost savings and reduced levels of possibly toxic by-product formation.

DETAILED DESCRIPTION OF THE INVENTION

Batch polymerization of N-vinyl pyrrolidone and vinyl monomers incorporating N-vinyl pyrrolidone monomer are known. These monomer systems comprise N-vinyl pyrrolidone to produce an N-vinyl pyrrolidone homopolymer or other vinyl monomers copolymerizable with N-vinyl pyrrolidone to product a copolymer containing N-vinyl pyrrolidone. The N-vinyl pyrrolidone content in the resulting polymers typically will range from 60 to 100% by weight with about 0 to 40% by weight of another vinyl monomer based on the resulting polymer. Examples of vinyl monomers commonly copolymerized with N-vinyl pyrrolidone include N-vinyl caprolactam, N-vinyl piperidone, vinyl esters, e.g., vinylacetate and vinylpropionate, $C_{1-4}$ alkyl esters of acrylic and methacrylic acid, e.g., methylacrylate and methyl methacrylate, $C_{1-4}$ esters of maleic and fumaric acid, e.g., dibutylmaleate; vinyl chloride, acrylonitrile, and others commonly used to form N-vinyl pyrrolidone containing copolymers.

The N-vinyl pyrrolidone polymers are prepared by batch polymerization, neat, wherein essentially all of the monomers are introduced to a stirred autoclave under conditions sufficient for effecting polymerization. No solvent or carrier is required. The catalysts commonly used in effecting polymerization are the oil soluble azo type catalysts represented by the formula:

wherein $R_1$ and $R_2$ are $C_4$ to C10 aliphatic and cycloaliphatic radicals. These azo type free radical generating catalysts include azobis(isobutyronitrile); azobis(dimethylvaleronitrile); azobis(methylbutyronitrile); azobis(ethylbutyronitrile); azobis(phenylpropionitrile); azobis(cyclohexylpropionitrile); azobis(cycloheptylpropionitrile), and the like. These azo type compounds are widely utilized in the art as free radical initiators and are effective for polymerization of N-vinyl pyrrolidone monomer containing systems. Temperatures for effecting polymerization range from about 100° to 130° C. and pressures range from about subatmospheric to above atmospheric; atmospheric pressure being preferred. Reaction times to produce an N-vinyl pyrrolidone polymer range from about 1 to 2 hours, resulting in a polymerization reaction product containing generally in the range from 1 to 2% residual monomer based on the weight of the polymerization reaction product.

Post polymerization of the residual monomer in the polymerization reaction product is accomplished by continuously adding the above described oil soluble, thermally activated azo type free radical initiators to the polymerization reaction product. The concentration of oil soluble, thermally activated azo type free radical initiator typically added to the polymerization reaction product ranges from about 0.15 to 2% and preferably from about 0.3 to 0.6% to reduce the free monomer content to a level below about 0.2% and preferably below about 0.1% by weight of the polymerization reaction product. Higher levels are not necessary and lead to enhanced by-product production. The continuous addition of the oil soluble, thermally activated free radical initiator not only is effective for reducing the free monomer content in the reaction product to acceptably low levels, there is substantially no change with respect to color or substantial change with respect to molecular weight or viscosity, and, yet, the polymerization can be accomplished in a much shorter time than when the free radical initiator is added incrementally as opposed to being added ab initio even at higher initiator levels.

The following examples are provided to illustrate various embodiments of the invention and are not intended to restrict the scope thereof.

EXAMPLE 1

Post Polymerization of N-Vinyl Pyrrolidone/Dibutylmaleate Graft Polymer using Azobis(isobutyronitrile)

An N-vinyl pyrrolidone (NVP)/dibutylmaleate polymerization reaction product is prepared by a conventional batch polymerization technique wherein the N-vinyl pyrrolidone and dibutylmaleate are charged to an autoclave containing a polyglycol reactant (which also serves as a solvent) and equipped with agitation and means for heating and cooling the reactants during polymerization. The polymerization is initiated with 1% of azobis(isobutyronitrile) based on the weight of the reactor contents. The contents are heated, under agitation, and polymerization is effected over a period of about 2 hours in which a polymerization reaction product containing from about 1 to 2 weight percent residual monomer is produced. Azobis(isobutyronitrile) is added to the polymerization reaction product to reduce residual monomers. Table 1 sets forth results for different charges of azobis(isobutyronitrile). In Run 1, 0.3 wt % of azobis(isobutyronitrile) is added ab initio, i.e., introduced initially to the polymerization reaction product. In Run 2, 0.3 wt % of azobis(isobutyronitrile) was added in two separate charges of 0.15 wt %. In Run 3, 0.3 wt % of azobis(isobutyronitrile) was added in three separate charges of 0.1 wt %. Residual vinyl monomer content is recorded as a function of time and is set forth in Table 1.

Table 2 sets forth results comparing the addition of a single 0.6% charge of azobis(isobutyronitrile) based upon the weight of the N-vinyl pyrrolidone polymerization reaction product (Run 4) vis-a-vis two charges of 0.6% azobis(isobutyronitrile) which were introduced on a continuous basis based upon the weight of the N-vinyl pyrrolidone polymerization reaction product over the 120 minute time frame (Runs 5 and 6). The percent residual N-vinyl pyrrolidone monomer is recorded as a function of time in minutes and the results are set forth.

TABLE 1

| | PELLET CHARGES | | |
|---|---|---|---|
| TIME Minutes | RUN 1 One 0.3% CHARGE % NVP | RUN 2 Two 0.15% CHARGES % NVP | RUN 3 Three 0.1% CHARGES % NVP |
| 0 | 1.0* | 1.0* | .90* |
| 15 | .36 | .51 | .46 |
| 30 | .22 | .45 | .42* |
| 45 | .26 | .36 | .35 |
| 60 | .23 | .26* | — |
| 75 | .22 | .15 | .19 |
| 90 | .22 | .11 | .14* |
| 105 | .22 | .10 | .12 |
| 120 | .22 | .09 | .11 |

*Time at which charge is introduced

TABLE 2

| | SLURRY CHARGES | | |
|---|---|---|---|
| TIME Minutes | RUN 4 One 0.6% CHARGE % NVP | RUN 5 0.6% CONTINUOUS % NVP | RUN 6 0.6% CONTINUOUS % NVP |
| 0 | 1.1* | 1.1 | 1.1 |
| 15 | .45 | .43 | — |

TABLE 2-continued

SLURRY CHARGES

| TIME Minutes | RUN 4 One 0.6% CHARGE % NVP | RUN 5 0.6% CONTINUOUS % NVP | RUN 6 0.6% CONTINUOUS % NVP |
|---|---|---|---|
| 30 | .33 | .32 | .32 |
| 45 | .29 | .21 | — |
| 60 | .28 | .17 | .16 |
| 75 | .23 | .14 | — |
| 90 | .24 | .12 | .11 |
| 105 | .25 | — | — |
| 120 | .25 | .06 | .08 |

*Time at which charge is introduced

Table 1 shows that the addition of azobis(isobutyronitrile) in a single charge (Run 1) is ineffective for reducing residual N-vinyl pyrrolidone monomer in the N-vinyl pyrrolidone polymerization reaction product. Greater reductions are achieved when the azobis(isobutyronitrile) is introduced in increments (Runs 2 and 3). The monomers were reduced to a level of about 0.1%.

The results in Table 2 show that the continuous addition of azobis(isobutyronitrile) (Runs 5 and 6) is much more effective at catalyzing the polymerization of the residual monomer, then when the catalyst is added ab initio (Run 4). The addition of 0.6% azobis(isobutyronitrile) in a single charge, ab initio, gave results similar to those shown with a single 0.3% charge (Run 1, Table 1). Table 2 also shows that extremely low levels of residual monomer are achieved in about 60 to 90 minutes when the azobis(isobutyronitrile) is added continuously (Runs 5 and 6), thus showing an excellent rate of reduction of residual vinyl monomer in the polymerization product. The post treated product had a good color, no viscosity increase or change in molecular weight distribution.

EXAMPLE 2

Post Polymerization N-Vinyl Pyrrolidone/Dibutylmaleate Graft Polymer using t-Butylperoxybenzoate An N-vinyl pyrrolidone/dibutylmaleate graft copolymer is prepared as in Example 1. The post-treatment processes consist of adding a continuous charge of t-butylperoxybenzoate (tBPB) as the oil soluble, thermally activated free radical initiator. Table 3 sets forth results wherein the t-butylperoxybenzoate is added at a rate of 1 wt % of the polymerization reaction product per hour. Table 4 sets forth results when the t-butylperoxybenzoate is added at a rate of 2 wt %, based upon the polymerization reaction product, per hour. Residual monomer versus time is set forth.

TABLE 3

| 1 wt % of t-butylperoxybenzoate/hr. | |
|---|---|
| TIME (min) | % WT NVP REMAINING |
| 0 | 0.81 |
| 15 | 0.76 |
| 45 | 0.71 |
| 75 | 0.65 |

TABLE 4

| 2 wt % of t-butylperoxybenzoate/hr. | |
|---|---|
| TIME (MIN) | % WT NVP REMAINING |
| 0 | 0.65 |
| 30 | 0.49 |
| 60 | 0.28 |
| 75 | 0.18 |
| 90 | 0.12 |
| 120 | 0.07 |

As can be seen from the results presented in Tables 3 and 4, the t-butylperoxybenzoate is inefficient as an oil soluble, thermally activated free radical initiator for the reduction of NVP in the polymerization reaction product. The amount of tBPB is 1.5% (1%/hour for 1.5 hours) in Table 3 and 4% (2%/hour for 2 hours} in Table 4. The amounts are extreme as compared to the azobis(isobutyronitrile) catalyst introduced on a continuous basis.

What is claimed is:

1. In a process for the batch polymerization of a solventless monomer system comprising N-vinyl pyrrolidone monomer for forming a polymer containing reaction product having from about 1 to 2 weight percent residual N-vinyl pyrrolidone monomer, the improvement for reducing the level of residual N-vinyl pyrrolidone monomer in the polymerization reaction product below about 0.2% by weight which comprises:

continuously adding an oil soluble, thermally activated azo containing free radical generating catalyst to the polymerization reaction product; and establishing and maintaining the reaction product at a temperature sufficient for effecting polymerization and for a time sufficient to effect polymerization of original monomer to a level below about 0.2% by weight.

2. The process of claim 1 wherein the oil soluble, thermally activated azo type free radical generating catalyst is represented by the formula:

$$N \equiv C - R_1 - N = N - R_2 - C \equiv N$$

wherein $R_1$ and $R_2$ are $C_4$ to $C_{10}$ aliphatic and cycloaliphatic radicals.

3. The process of claim 2 wherein the monomer system comprises N-vinyl pyrrolidone monomer and optionally one or more monomers selected from the group consisting of N-vinyl caprolactam, N-vinyl piperidone, a vinyl ester, a $C_{1-4}$ alkyl ester of acrylic acid, a $C_{1-4}$ alkyl ester of methacrylic acid, a $C_{1-4}$ alkyl ester of maleic acid, a $C_{1-4}$ alkyl ester of fumaric acid, vinyl chloride, and acrylonitrile, wherein the polymerization reaction product will contain at least about 60% by weight N-vinyl pyrrolidone.

4. The process of claim 3 wherein the azo containing free radical generating catalyst is added in an amount from 0.15 to 2% by weight of the polymerization reaction product.

5. The process of claim 4 wherein the azo containing free radical generating catalyst is azobis(isobutyronitrile).

6. The process of claim 5 wherein the monomer system consists essentially of N-vinyl pyrrolidone.

7. The process of claim 6 wherein the azobis(isobutyronitrile) catalyst is added in an amount from about 0.3 to 0.6% by weight of the polymerization reaction product.

* * * * *

UNITED STATES PATENT AND TRADEMARK OFFICE
CERTIFICATE OF CORRECTION

PATENT NO. : 5,506,318
DATED : Apr. 9, 1996
INVENTOR(S) : Wetzel, et al.

It is certified that error appears in the above-indentified patent and that said Letters Patent is hereby corrected as shown below:

In the Claims:

Column 6, line 39, delete "type" and insert --containing-- therefor.

Signed and Sealed this

Twenty-fifth Day of June, 1996

Attest:

BRUCE LEHMAN

*Attesting Officer*        *Commissioner of Patents and Trademarks*